(12) United States Patent
Meng

(10) Patent No.: US 8,145,663 B2
(45) Date of Patent: *Mar. 27, 2012

(54) APPARATUS FOR PROCESSING REAL-TIME MOBILE TRANSACTIONS IN A THREE-TIER DISTRIBUTED DATABASE SYSTEM

(75) Inventor: Frank Meng, Brea, CA (US)

(73) Assignee: International Business Machines Corporation, Armonk, NY (US)

( * ) Notice: Subject to any disclaimer, the term of this patent is extended or adjusted under 35 U.S.C. 154(b) by 665 days.

This patent is subject to a terminal disclaimer.

(21) Appl. No.: 12/180,307

(22) Filed: Jul. 25, 2008

(65) Prior Publication Data

US 2008/0281825 A1 Nov. 13, 2008

Related U.S. Application Data

(63) Continuation of application No. 10/107,003, filed on Mar. 25, 2002, now Pat. No. 7,421,430.

(51) Int. Cl.
G06F 17/30 (2006.01)

(52) U.S. Cl. ........ 707/769; 707/781; 707/636; 707/655; 707/782

(58) Field of Classification Search .................. 707/769, 707/781, 636, 655, 782
See application file for complete search history.

(56) References Cited

U.S. PATENT DOCUMENTS

| | | | |
|---|---|---|---|
| 5,515,537 A | 5/1996 | Tavares et al. | |
| 5,867,686 A | 2/1999 | Conner et al. | |
| 6,032,216 A | 2/2000 | Schmuck et al. | |
| 6,041,383 A | 3/2000 | Jeffords et al. | |
| 6,148,199 A | 11/2000 | Hoffman et al. | |
| 6,188,400 B1 | 2/2001 | House et al. | |
| 6,606,626 B1 * | 8/2003 | Ponnekanti | 1/1 |
| 6,609,128 B1 | 8/2003 | Underwood | |
| 6,629,127 B1 | 9/2003 | Deen et al. | |
| 6,676,089 B1 * | 1/2004 | Katzer | 246/1 R |
| 2002/0026478 A1 * | 2/2002 | Rodgers et al. | 709/205 |

OTHER PUBLICATIONS

Ding et al., "A novel conflict decision and resolution strategy based on TLRSP in replicated mobile database systems", Proceedings Seventh International conference on Database Systems for Advanced Applications, Apr. 18-21, 2001,234-240; Retrieved from the Internet:<URL: http://ieeexplore.ieee.org/xpls/abs_all.jsp?arnumber=916383>.*

Ding et al., "A Novel Conflict Decision and Resolution Strategy Based on TLRSP in Replicated Mobile Database Systems", Proceedings Seventh International Conference on Database Systems for Advanced Applications, Apr. 18-21, 2001, 234-240. IEEE, USA.

Kang et al., "Transaction Management for Multilevel Secure Replicated Databases," Journal of Computer Security, 1994-1995, 115-145, vol. 3, No. 2-3, IOS Press, Netherlands.

* cited by examiner

Primary Examiner — John E Breene
Assistant Examiner — Dennis Myint
(74) Attorney, Agent, or Firm — Kunzler Needham Massey & Thorpe

(57) ABSTRACT

An apparatus that enables real-time processing of mobile based transactions in a three-tier database by employing pending operation/locks databases at each mirror in the three-tier database and generating a token for each proposed transaction that indicates the operations/locks needed to perform the transaction. The token is passed to each mirror database to compare with the corresponding operation/lock database. When a conflict is detected, a flag indicating such is set.

14 Claims, 12 Drawing Sheets

APPARATUS FOR PROCESSING REAL-TIME MOBILE TRANSACTIONS IN A THREE-TIER DISTRIBUTED DATABASE SYSTEM

CROSS-REFERENCE TO RELATED APPLICATIONS

This application is a continuation of and claims priority to U.S. patent application Ser. No. 10/107,003 entitled "A METHOD FOR PROCESSING REAL-TIME MOBILE TRANSACTIONS IN A THREE-TIER DISTRIBUTED DATABASE SYSTEM" and filed on Mar. 25, 2002 for Frank Meng, which is incorporated herein by reference.

BACKGROUND

1. Field of the Invention

This invention relates to managing transactions in three-tier distributed database systems, and more particularly relates to managing real-time transactions in three-tier distributed database systems.

2. Description of the Related Art

A three-tier distributed database system consists of mobile client databases, which synchronize data with mid-tier or mirror databases, which in turn contain data replicated from source databases. When a mobile client database performs synchronization, a set of client database operations is sent to a mirror database. During replication, these operations are transmitted from the mirror database to the source databases. Due to the existence of multiple mirror databases, the operations may be rejected because of conflicts with other pending operations submitted by clients of other mirror databases. Since the replication window can be arbitrarily large, the mirror databases are not always consistent with each other or with the source databases. Further, there is a need for an apparatus that enables mobile clients to directly submit mobile transactions to a mirror database (versus waiting for synchronization between the same). A mobile transaction is a database transaction that originates from a mobile client, but is executed on a mirror database, and the results are returned to the mobile client. When a mobile client submits a mobile transaction to a mirror database, the mirror database may not have the most up-to-date data until replication with the source databases and the other mirror databases is performed. Thus, there is a need for an apparatus that determines in real-time whether a given mobile transaction or synchronization to be executed on a given mirror database may be rejected upon replication because of other pending transactions (awaiting replication).

SUMMARY OF THE INVENTION

The present invention provides an apparatus that enables real-time determination of whether a mobile-based proposed transaction or synchronization in a three-tier distributed database system to be executed on a mirror database will be accepted when mirror database replicates with source databases. The apparatus generates a token at the mirror database where the token includes the locks needed for tuples or records to complete the proposed transaction or synchronization. The token is passed to each mirror database associated with the source databases. Each mirror database has a synchronization window (database) that includes the locks needed for tuples or records for mobile-based transactions to be replicated from the mirror database to the source databases. The method compares the tuples and locks in the token to those in synchronization window for each mirror database.

When there is a conflict in a mirror database, the apparatus sets a flag indicating such and forwards the token to the next mirror. When the token reaches the originating mirror, the method evaluates the flag in the token. When the token indicates no conflict, the apparatus adds the tuples and locks for the proposed transaction to the originating mirror's synchronization window database. Otherwise, the apparatus rolls back or rejects the originating mirror's proposed transaction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

Like reference numbers and designations in the various drawings indicate like elements.

DETAILED DESCRIPTION OF THE INVENTION

Throughout this description, preferred embodiment and examples shown should be considered as exemplars, rather than as limitations on the present invention.

Figure 1:
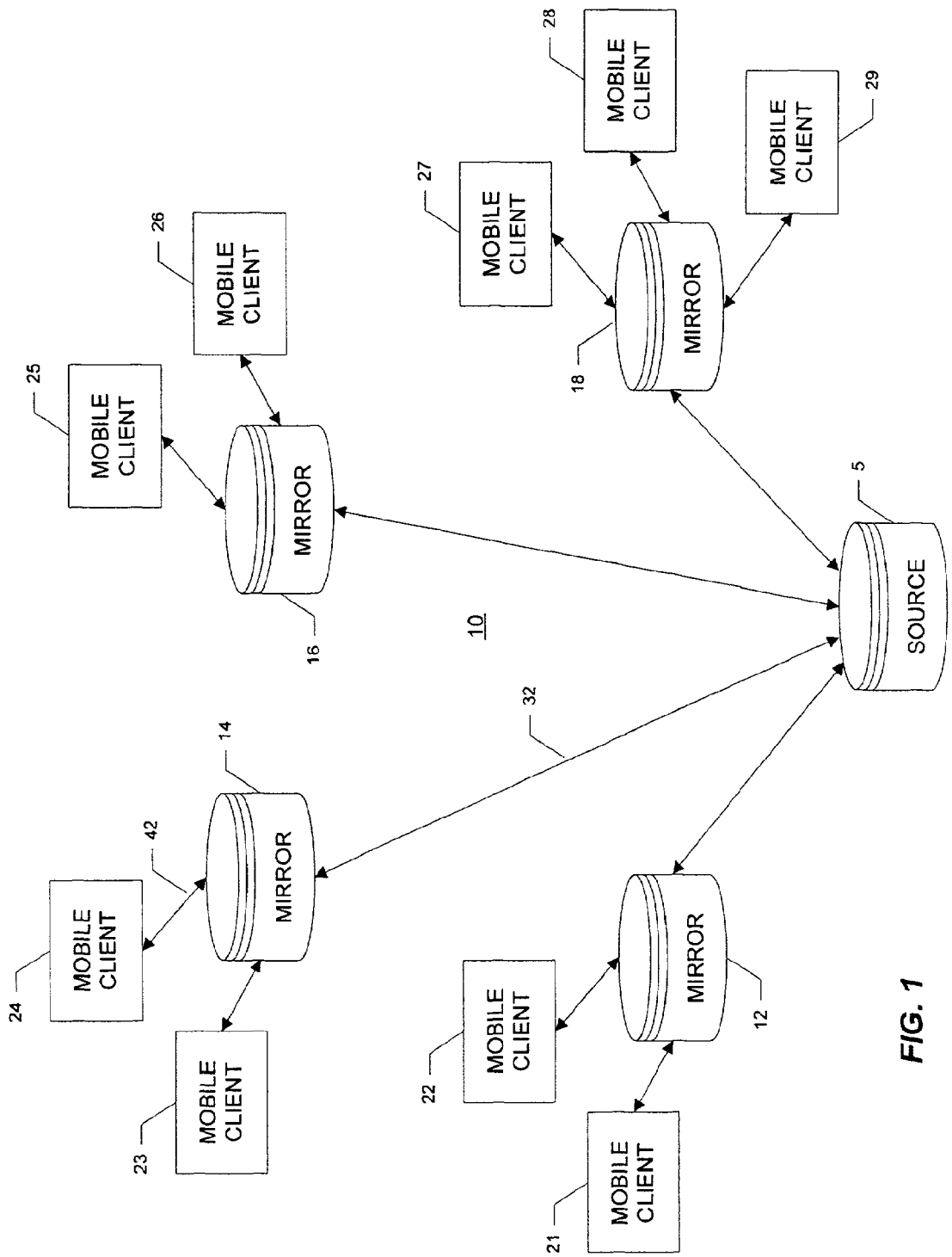
FIG. 1 is a diagram of an exemplary three-tier distributed database system where the apparatus of the present invention may be employed.

FIG. 1 is a diagram of an exemplary three-tier distributed database system 10 in which the present may be employed. The database system 10 includes a source database 5, mirror databases 12, 14, 16, and 18 and mobile clients 21-29. The mobile clients 21-29 are coupled to mirror databases, clients 21 and 22 to database 12, clients 23 and 24 to database 14, clients 25 and 26 to database 16 and clients 27, 28, and 29 to database 18. The mirror databases 12, 14, 16, and 18 are also coupled to the source database 5. Mobile clients perform transactions and then synchronize the transactions with a corresponding mirror database. The mirror databases replicate data received from the mobile clients to the source database 5. Upon replication, the mirror databases 12, 14, 16, and 18 are synchronized with the source database 5.

When a mobile client database 21-29 performs synchronization with a corresponding mirror database, a set of client database operations is sent to a mirror database. During replication, these operations are transmitted from the mirror database to the source database 5. Due to the existence of the multiple mirror databases, the operations may be rejected because of conflict with other pending operations submitted by clients of other mirror databases. Since the replication window can be arbitrarily large, the mirror databases are not always consistent with each other or with the source databases (single source database 5 in the exemplary figure). The present invention prevents rejection of operations during replication. The present invention also enables mobile clients to directly submit mobile transactions to a mirror database and advise in real-time whether the transaction introduces a conflict with transactions in mirror databases awaiting replication with the source database. Mobile transactions are database transaction that originates from mobile clients, but are executed on mirror databases, and the results are returned to the mobile clients.

In the distributed data system 10, the current state of the data is contained in the mirror databases 12, 14, 16, and 18 and the source database 5. When a mobile transaction or synchronization is executed, the present invention determines if the transaction(s) includes changes to one or more tuples or records that are subject to pending changes in a mirror database. In particular, each mirror database has an associated synchronization ("sync") window database that includes the database operations (inserts, updates, and/or deletes) that will be performed during replication. Thus, each mirror database's sync window contains the tuples and type of change made on the tuples by the mobile clients that have synchronized with or submitted transactions on the mirror database. In another embodiment, the sync windows includes the set of tuples and their associated locks (shared or exclusive) needed for the mirror database to perform replication with the source database 5. An example of the mirror databases 12, 14, 16, and 18 with associated sync windows 52, 54, 56, and 58 is shown in FIG. 2.

Figure 2:
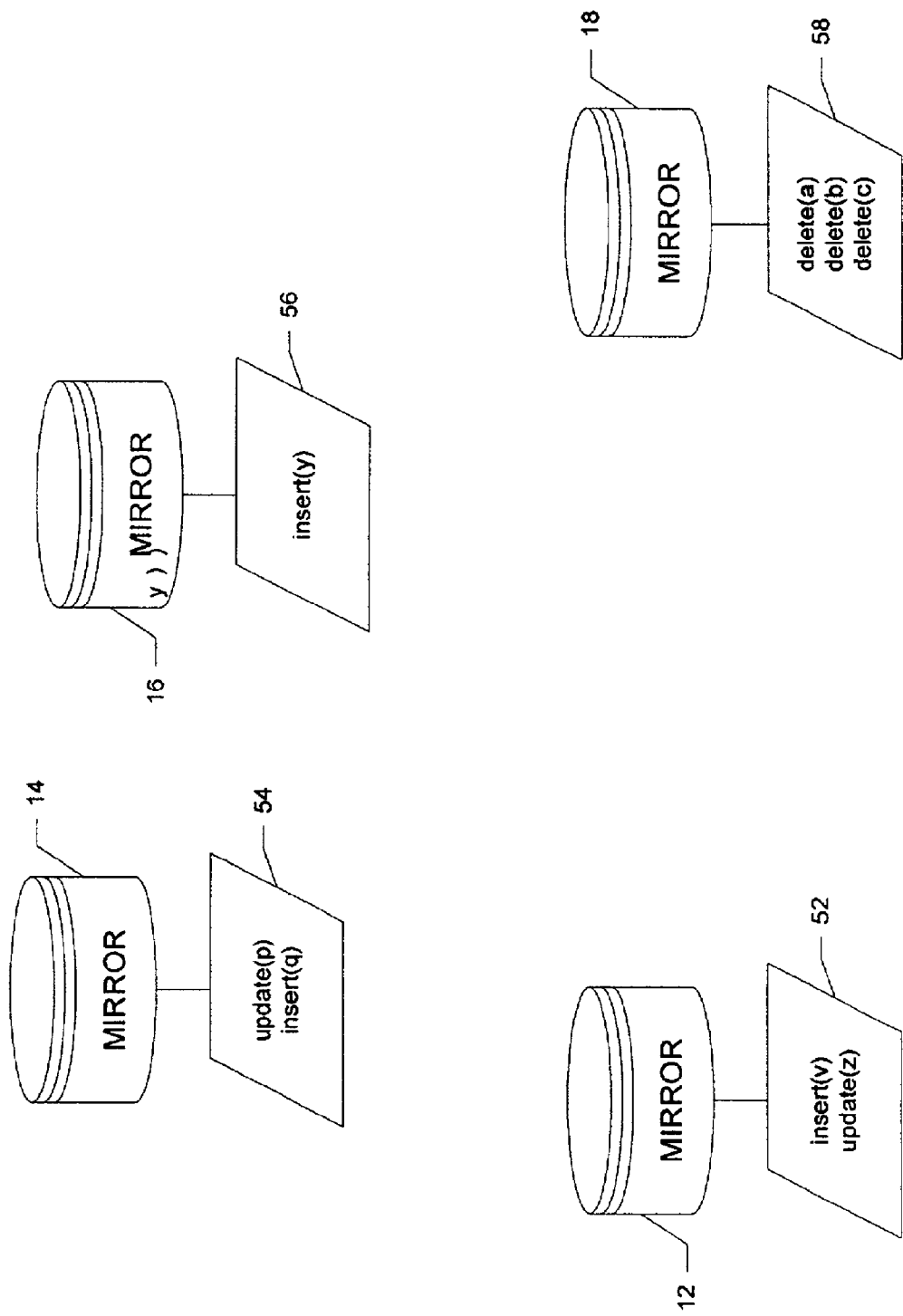
FIGS. 2-7 are diagrams of an exemplary process according to an embodiment of the present invention.
Figure 3:
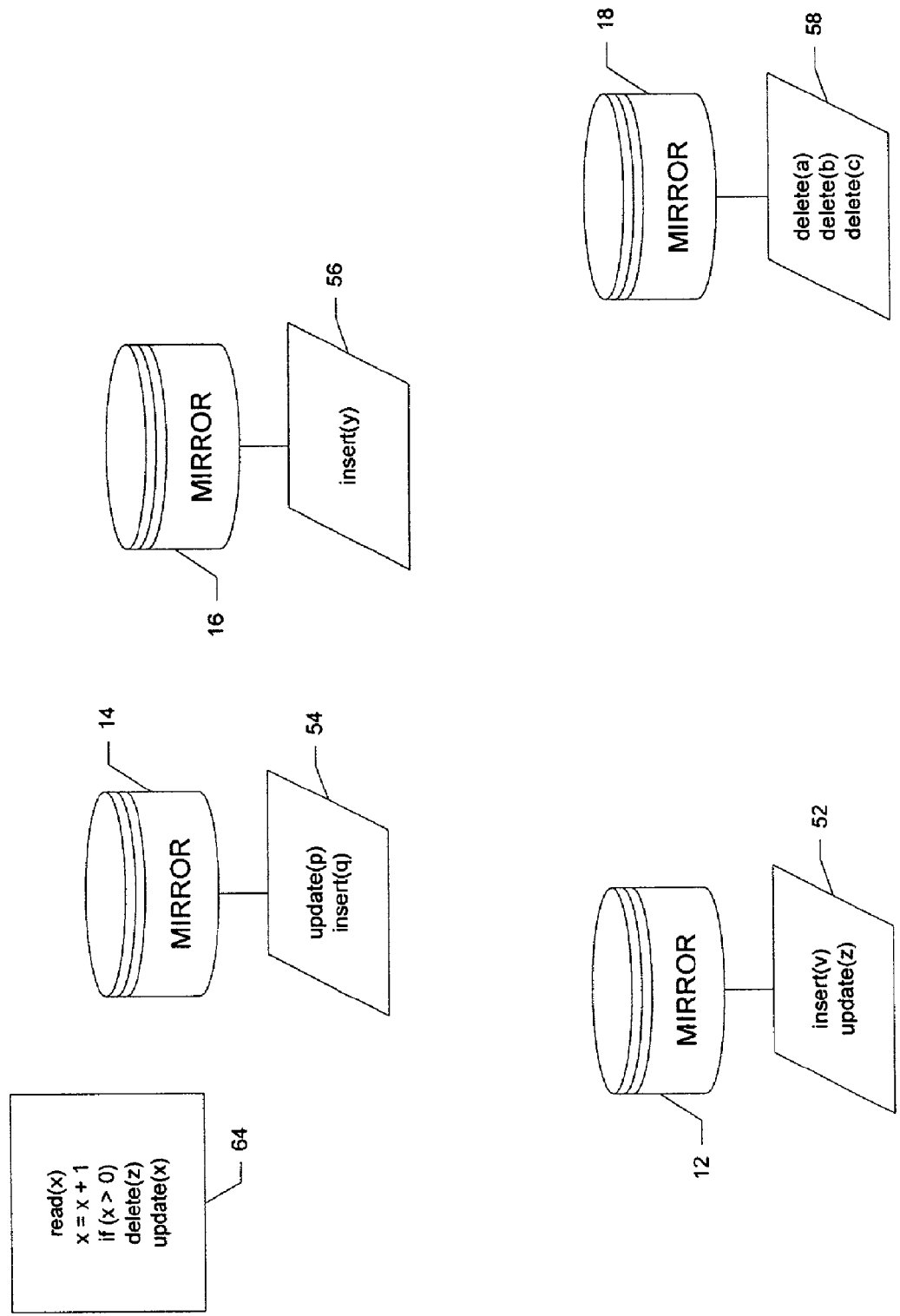
Figure 4:
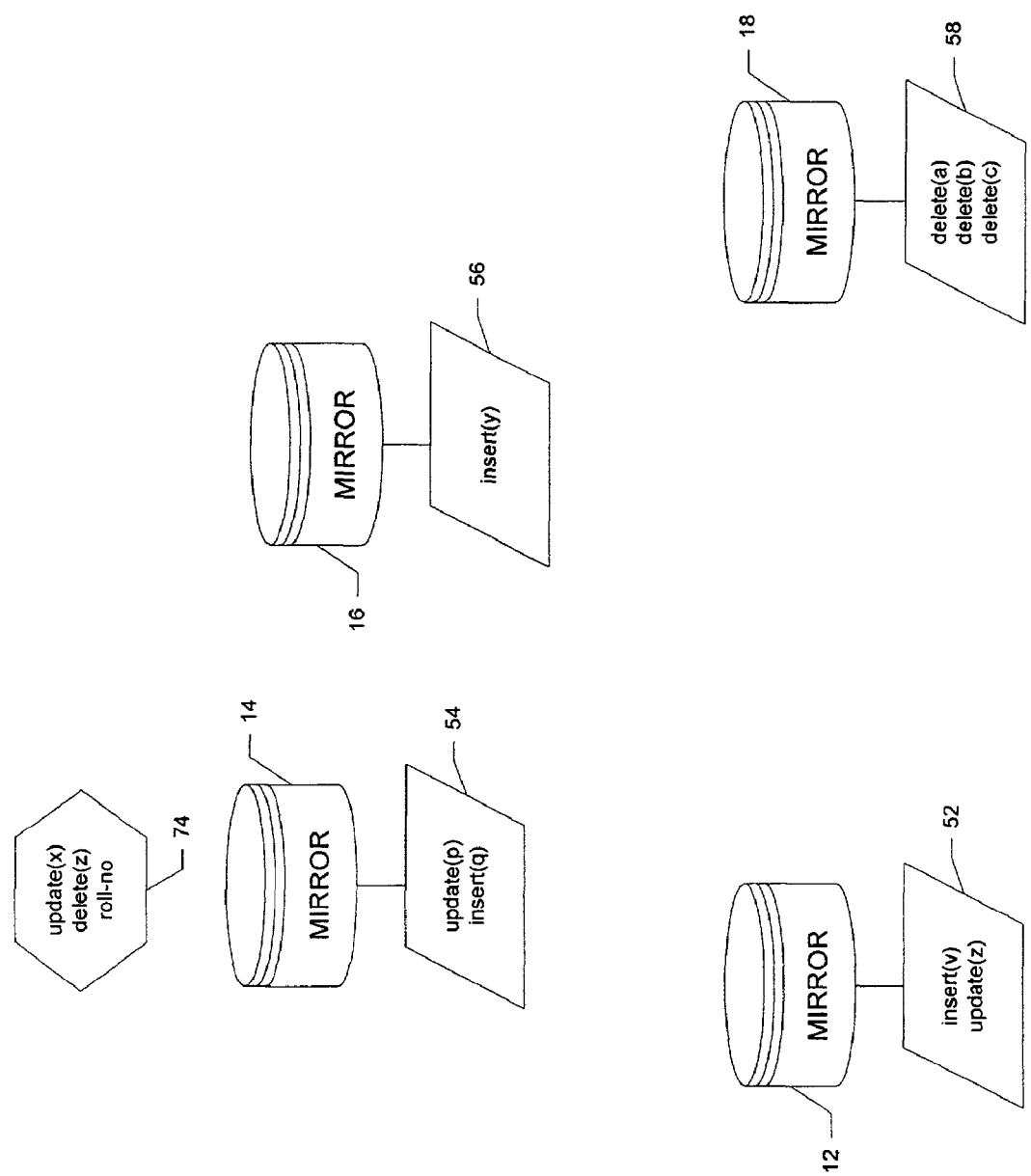
Figure 12:
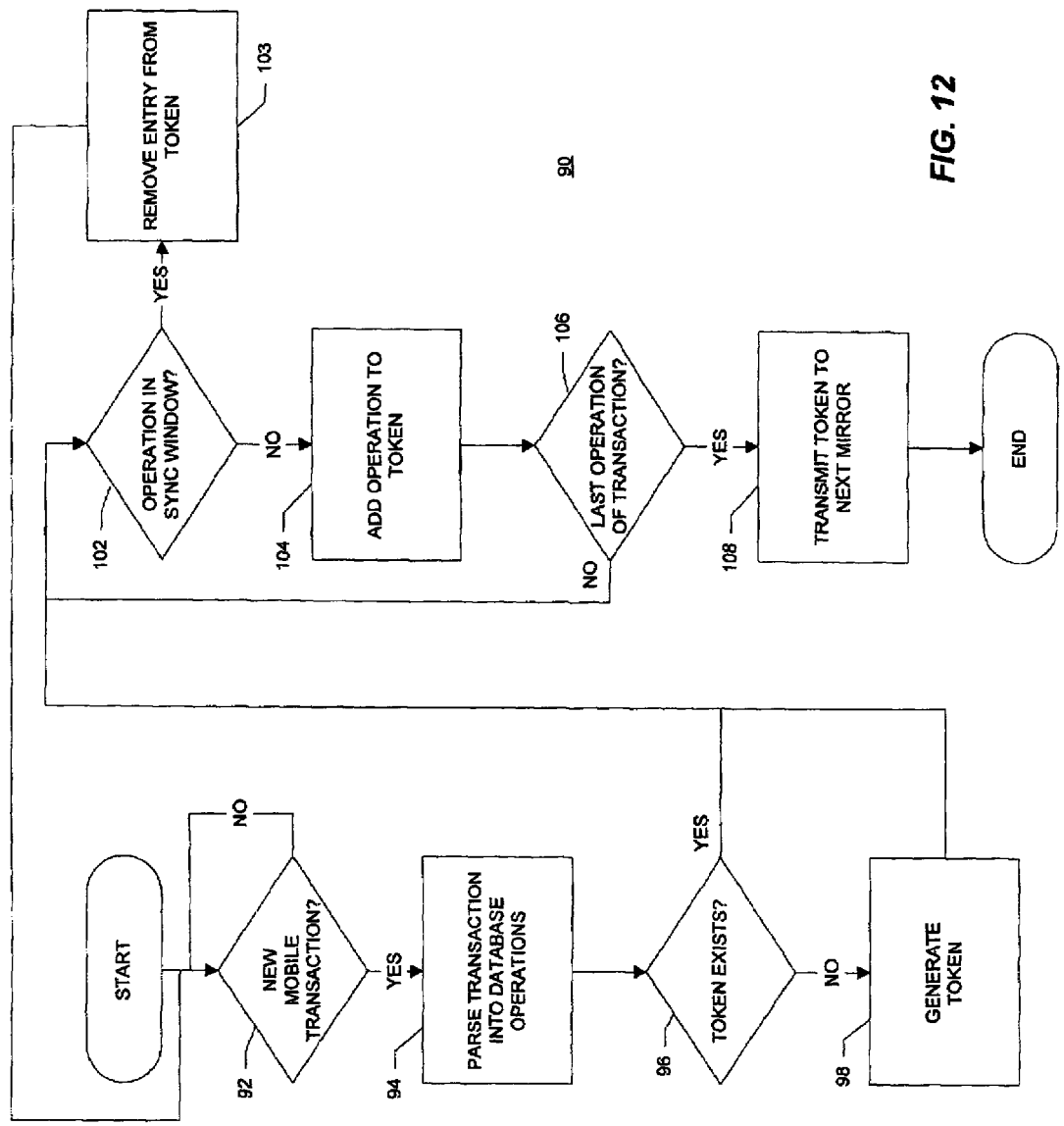
FIG. 12 is a flow diagram of an exemplary method to be executed at a mirror database according to an embodiment of the present invention.
Figure 13:
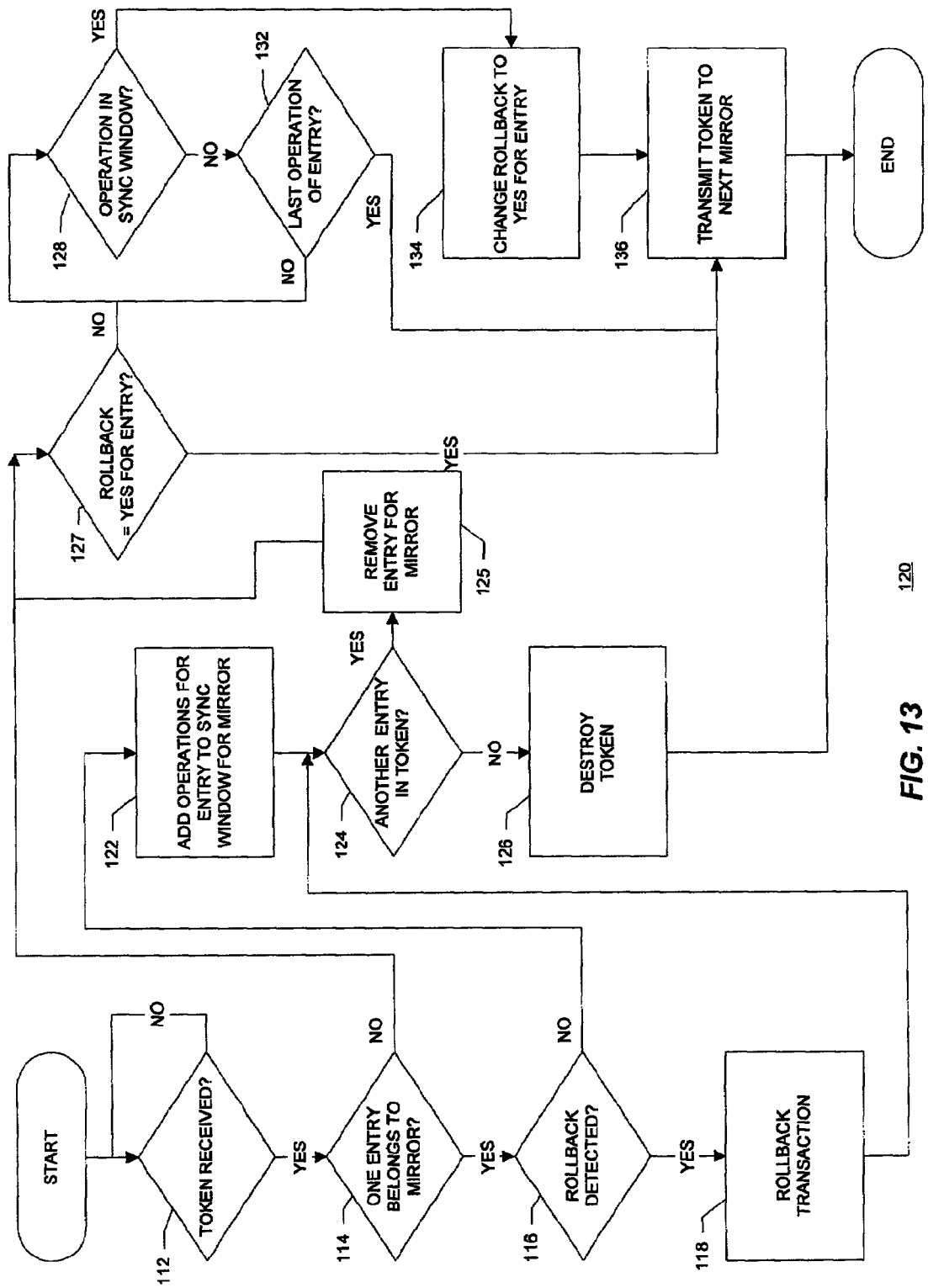
FIG. 13 is a flow diagram of another exemplary method to be executed at a mirror database according to an embodiment of the present invention.

As shown in FIG. 2, each sync window 52, 54, 56, and 58 includes the operation and tuple for pending changes to the source database 5. For example, mirror database 12 includes two pending database changes; an insertion of tuple v and an update of tuple z. FIGS. 3 to 7 and FIGS. 8 to 10 illustrate a process of evaluating whether a proposed transaction may conflict with other pending transactions in accordance with the present invention. FIGS. 12 and 13 are flowcharts depicting exemplary methods employed in the process illustrated in FIGS. 3 to 10. In detail, when a mobile transaction is submitted to a mirror database (step 92), such as transaction 64 to mirror database 14 as shown in FIG. 3, the present invention determines the operations and tuples associated with the submitted or proposed transaction 64 (step 94). In another embodiment, the invention determines the set of necessary locks for the tuples associated with for the proposed transaction. The present invention then forms a token indicating the operations or locks and associated tuples such as the token 74 shown in FIG. 4 for the transaction 64 (steps 96, 98, 102, 104, 106). The invention compares each operation on a tuple to its own sync window (step 102) to first ensure that the proposed transaction does not conflict with the mirror database's own pending database operations. When the operation does conflict with a pending operation for the originating mirror database, the entry to the token is not formed (step 103). In this example, the token 74 has an entry that indicates that the proposed transaction requires an update to tuple x and the deletion of tuple z. This token 74 is then transmitted to the mirror databases associated with source database 5 for evaluation (method 120 of FIG. 13), in this example to mirror databases 16, 18, and 12 (step 108).

Figure 5:
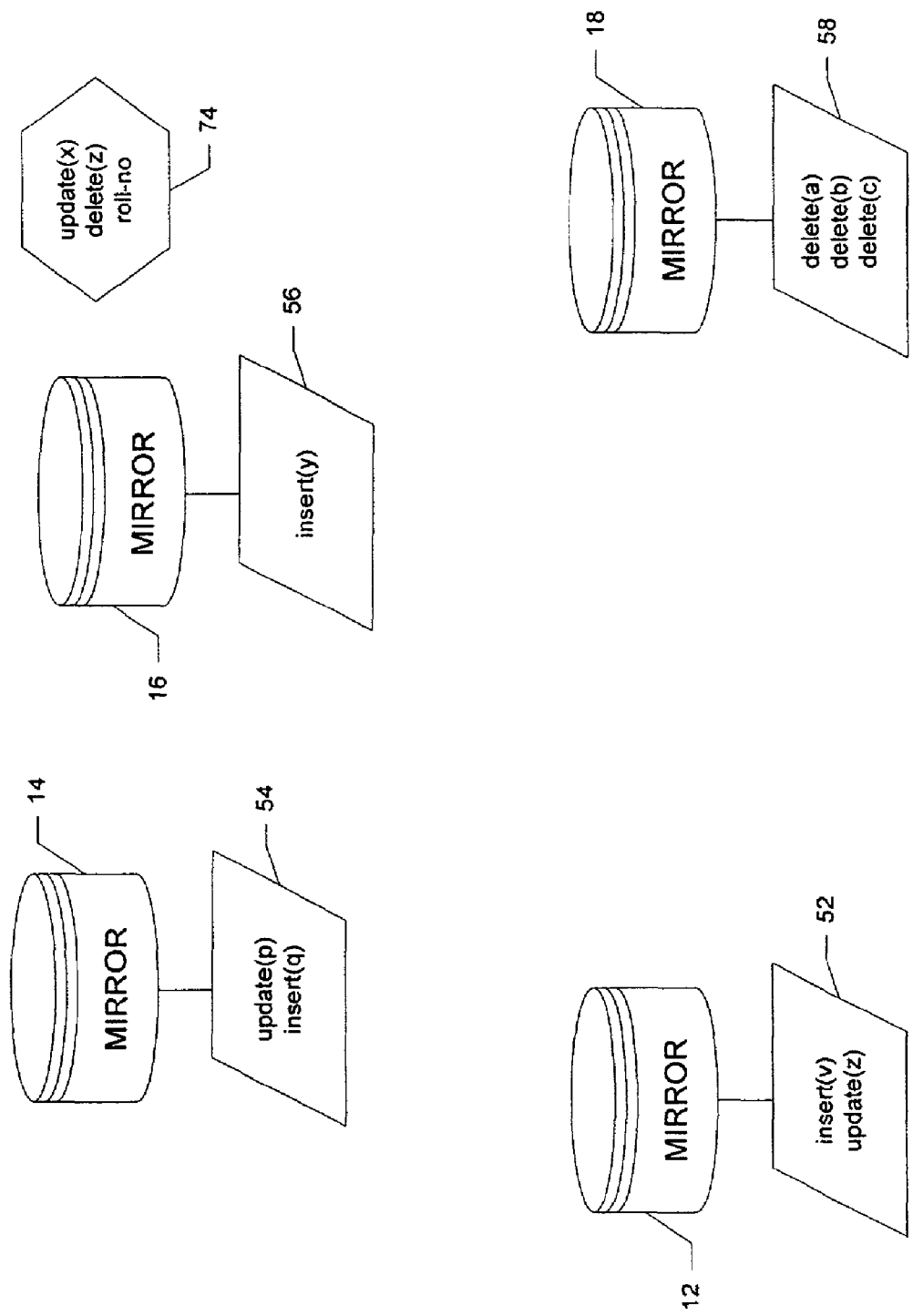
Figure 6:
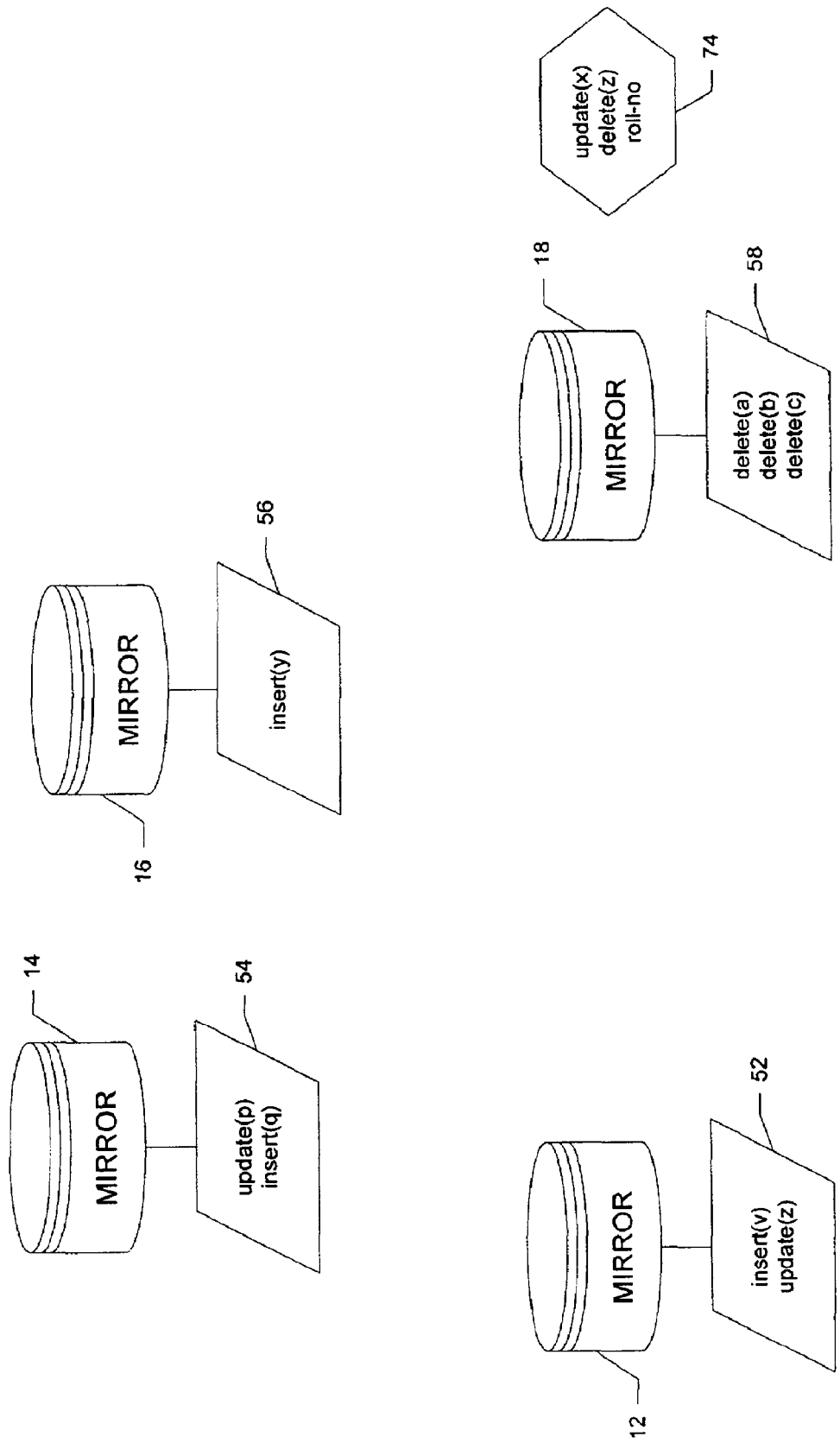
Figure 7:
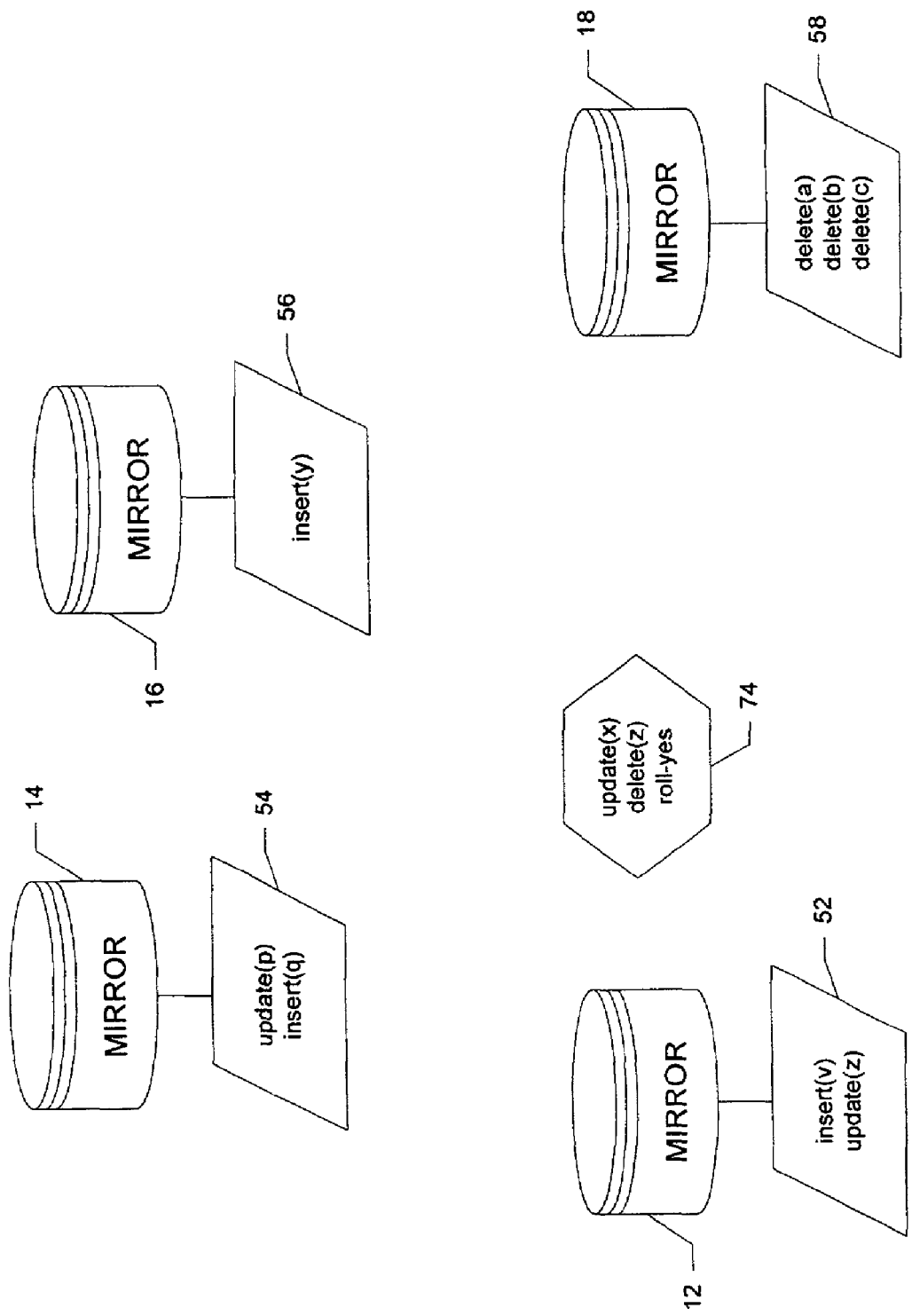

As this token 74 is passed, mirror databases are also executing mobile transactions that may add an entry indicating the reserve locks or operations needed for the mobile transaction. When a mirror database receives the token 74 (step 112) and it is not the originating database (step 114), it compares the locks or operations in the token with the locks or operations needed in its sync window, e.g., mirror database 16 with sync window 56 shown in FIG. 5 comparing the token 74 to its sync window 56 (steps 128 and 132) provided the roll flag is not already set to "YES" (step 127). When the sync window contains a lock or operation on a tuple that is incompatible with a lock or operation on a tuple in the token, an indication is made in the token that the corresponding proposed mobile transaction(s) must be rolled back. In this example, the flag roll shown in token 74 is set to "YES" (step 134). In this example, mirror database 16 passes the token unchanged (FIG. 5) and mirror database 18 passes the token unchanged (FIG. 6) (step 136). The present invention changes the roll flag to "YES" at mirror database 12 (FIG. 7) because of the conflicting operation on tuple z in the sync window 52 of the database 12.

Figure 8:
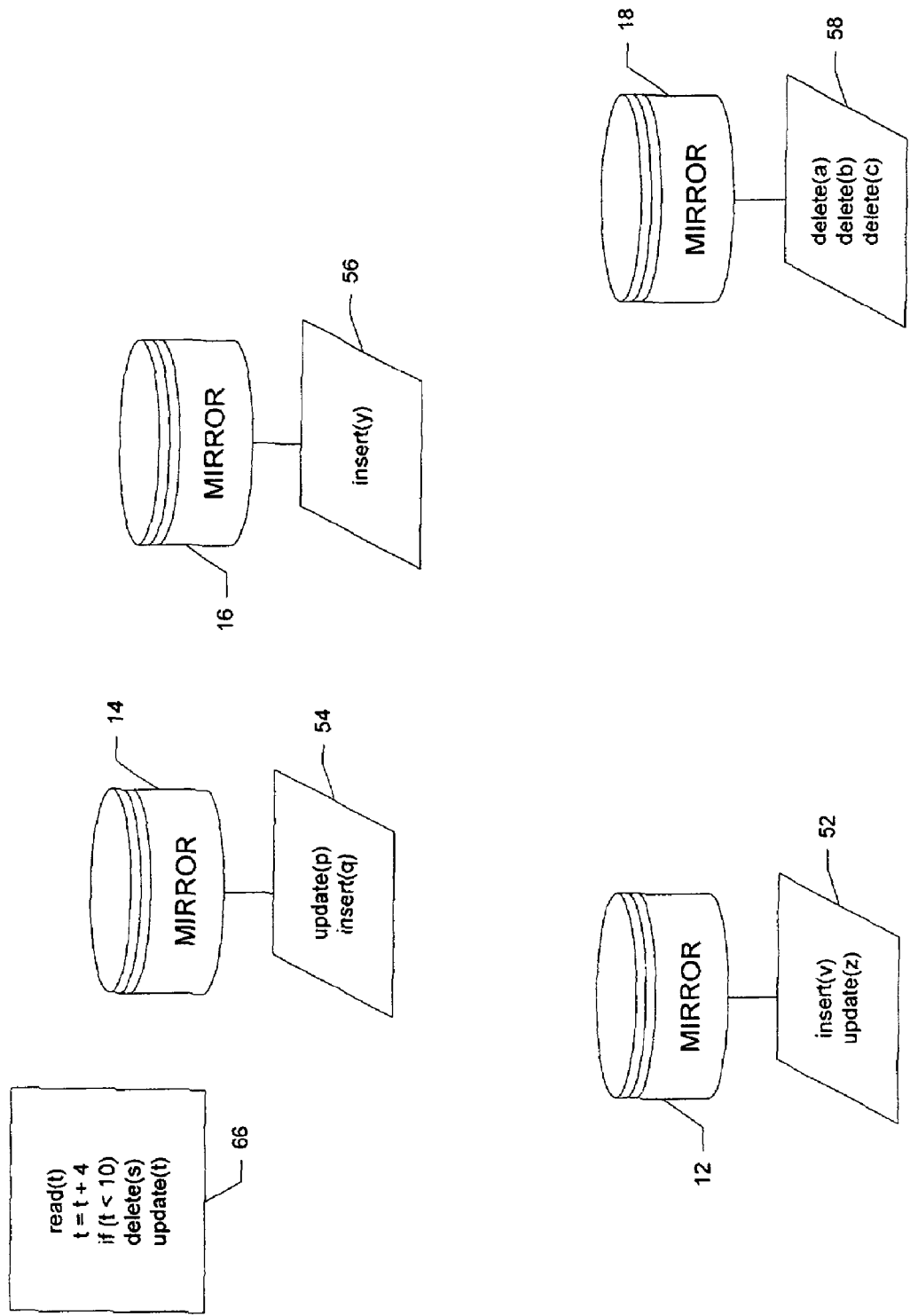
FIGS. 8-10 are diagrams of an exemplary process according to an embodiment of the present invention.
Figure 9:
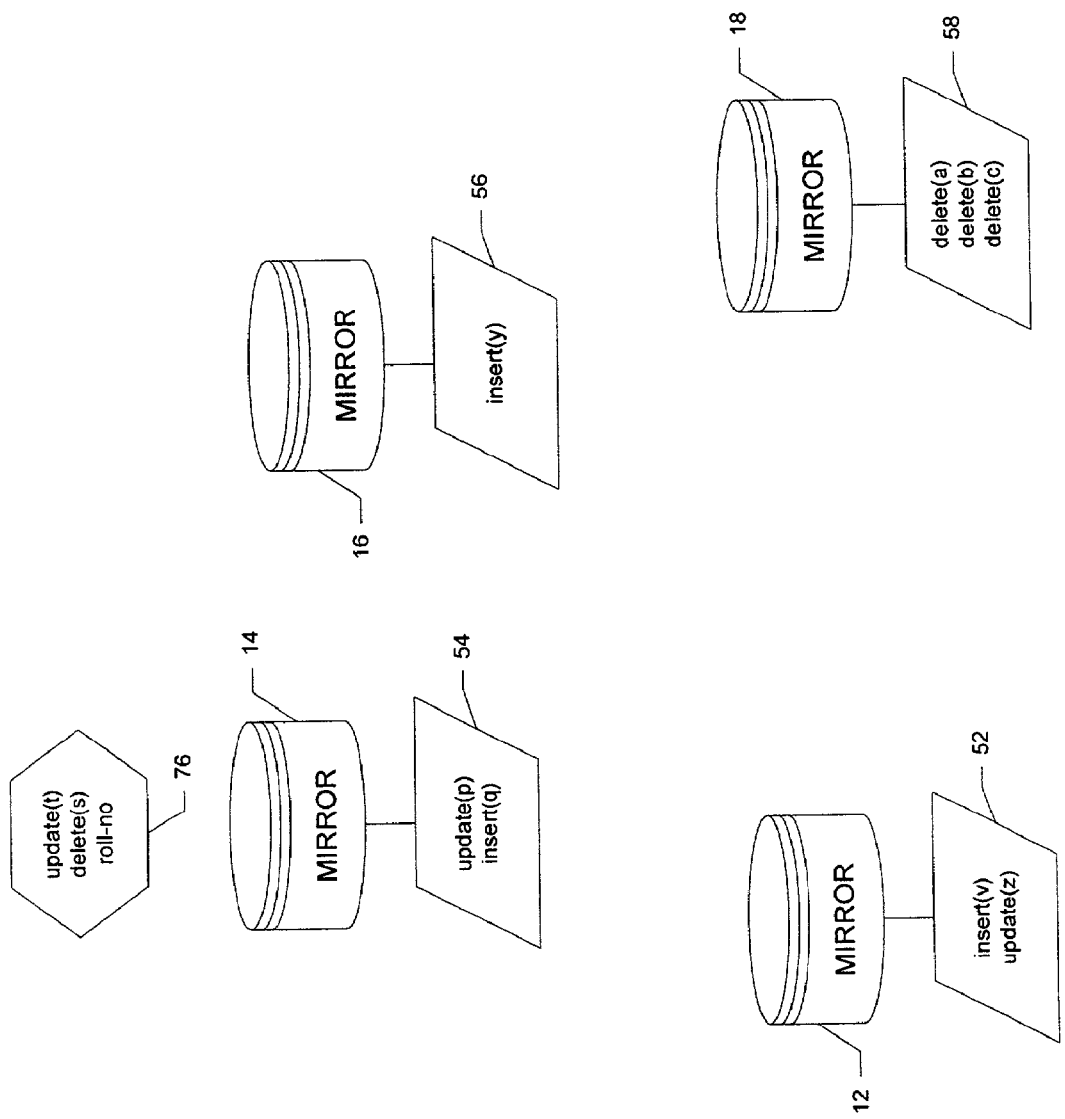
Figure 10:
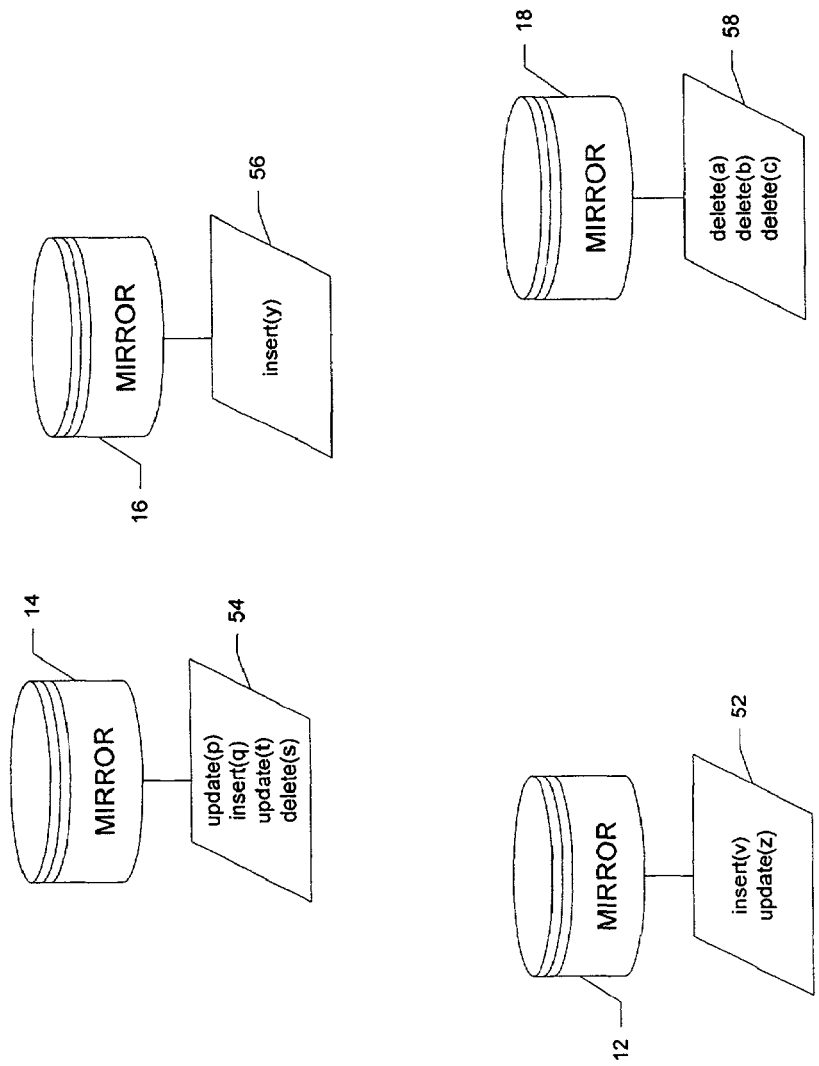

When the token 74 returns to the mirror database that generated the entry in the token (mirror database 14) (step 114), the transaction is rolled back because the roll flag is set "YES" (step 116 and 118). FIGS. 8 to 10 represent another mobile transaction proposal process for mirror database 14. As shown in FIG. 8, a transaction 66 is proposed. The invention determines the locks or operations on tuples needed for this transaction 66 and generates a token 76 including the same. The token 76 (FIG. 9) indicates that the transaction 66 requires two operations, an update to tuple t and a deletion of tuple s. The token 76 is then propagated to the associated mirror databases for comparison with their sync windows. In this case, no conflict is detected and the token returns to mirror database 14 with the roll flag set to "NO". Then, the invention knows the proposed mobile transaction can be performed with no conflicts to other pending database changes (step 114 and 116). The invention updates the mirror's 14 sync window 54 to include the lock or operations on the tuples needed for the transaction as shown in FIG. 10 (step 122). In either case, the lock reservations for this transaction are then removed from the token (step 125). If the token contains no more reservations, the token is destroyed (step 126).

Another exemplary lock reservation token consists of multiple transaction entries that have the following format:
originating mirror database ID
originating mobile client ID:session number
Table T1
PK1 S
PK2 S
. . .
Table Tn
PK1 X
PK2 S
Rollback?: [Y/N]

The first line of this token includes the unique ID of the originating mirror database. The second line is a unique identifier for the mobile client's proposed transaction that is composed of the mobile client's unique ID appended with the current session number for the client (where the session number is unique for each mobile client). This entry may be needed to differentiate multiple mobile transactions originating from the same mirror. Then, for each table involved (n tables in this example T1 through Tn), there is a set of tuples, indicated by their primary key columns (PKn) and their corresponding lock types (X for exclusive or S for shared) need for the proposed transaction. Finally, there is a flag indicating whether the transaction should be rolled back.

Figure 11:
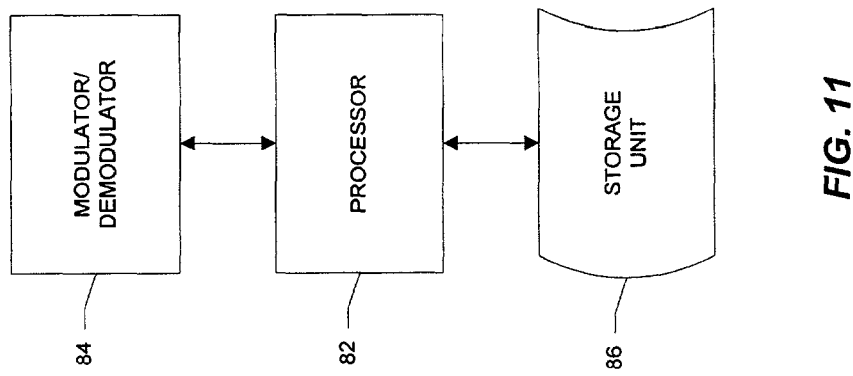
FIG. 11 is a block diagram of an exemplary apparatus according to an embodiment of the present invention.

FIG. 11 depicts an apparatus 80 in accordance with the present invention. The apparatus 80 includes a processor 82, a storage unit 86, and communications device 84. The processor 82 may be any suitable microprocessor that may be used to execute the methods shown in FIGS. 12 and 13. The storage unit 86 may be any known storage unit such as hard drive, floppy drive, CDROM, DVDROM, and optical drive. The storage unit 86 may be used to store a mirror database, sync window database and program instructions for performing the steps of the methods shown in FIGS. 12 and 13. The communications device 84 may be any device enabling the apparatus 80 to communicate data, such as tokens, to other mirror databases and source databases.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware (e.g., a software language other than Java, such as C++ or others may be used to implement the invention). As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. An article of manufacture for use in communicating a proposed database transaction in a multiple level database system having a plurality of mirror databases, the article of manufacture comprising computer readable program code on a machine readable storage medium that causes control circuitry to perform the steps of:
   receiving a token at a second mirror database of the plurality of mirror databases, each mirror database comprising a sync window for a pending operation, the token comprising an indication of a lock reservation needed for a proposed database transaction in a first mirror database of the plurality of mirror databases, the proposed database transaction comprising a database transaction for a first database of a first mobile client, the first mobile client coupled to the first mirror database;
   evaluating the token to determine whether the lock reservation of the token conflict with an operation pending execution within the sync window of the second mirror database;
   setting a roll flag in the token in response to a conflict with the operation identified within the sync window of the second mirror database, the roll flag instructing the first mirror database to roll back the proposed database transaction in the first mirror database; and
   transmitting the token to a next mirror database of the plurality of mirror databases.

2. the article of manufacture of claim 1, wherein the multiple level database system is at least a three-tier database system.

3. The article of manufacture of claim 2, wherein the first database is a third level database, the proposed database transaction is generated for the first database, the first database is coupled to the first mirror database, and the plurality of mirror databases are coupled to a source database.

4. The article of manufacture of claim 3, wherein each sync window indicates operations to be performed by pending database transactions of a third level database coupled to the mirror database.

5. The article of manufacture of claim 4, wherein the proposed database transaction is generated by the first database.

6. The article of manufacture of claim 5, further performing the step of rejecting the proposed database transaction at the first mirror database in response to receiving the token and determining that the roll flag is set.

7. The article of manufacture of claim 6, further performing the step of adding the operation to be performed by the proposed database transaction to the sync window of the first mirror database in response to receiving the token and determining that the roll flag is not set.

8. An apparatus for communicating a proposed database transaction in a multiple level database system having a plurality of mirror databases, comprising:
   means for receiving a token at a second mirror database of the plurality of mirror databases, each mirror database comprising a sync window for a pending operation, the token comprising an indication of a lock reservation needed for a proposed database transaction in a first mirror database of the plurality of mirror databases, the proposed database transaction comprising a database transaction for a first database of a first mobile client, the first mobile client coupled to the first mirror database
   means for evaluating the token to determine whether the lock reservation of the token conflict with an operation pending execution within the sync window of the second mirror database;
   means for setting a roll flag in the token in response to a conflict with the operation identified within the sync window of the second mirror database, the roll flag instructing the first mirror database to roll back the proposed database transaction in the first mirror database;
   means for determining a second lock reservation needed for a proposed database transaction in the second mirror database, the proposed database transaction originating from a second mobile client, the second mobile client coupled to the second mirror database; and
   means for adding the second lock reservation to the token at the second mirror database.

9. The apparatus of claim 8, wherein the multiple level database system is at least a three-tier database system.

10. The apparatus of claim 9, wherein the first database is a third level database, the proposed database transaction is generated for the first database, the first database is coupled to the first mirror database, and the plurality of mirror databases are coupled to a source database.

11. The apparatus of claim 10, wherein each sync window indicates operations to be performed by the pending database transactions of a third level database coupled to the mirror database.

12. The apparatus of claim 11, wherein the proposed database transaction is generated by the first database.

13. The apparatus of claim 12, further comprising means for rejecting the proposed database transaction at the first mirror database in response to receiving the token and determining that the roll flag is set.

14. The apparatus of claim 13, further comprising means for adding the operation to be performed by the proposed database transaction to the sync window of the first mirror database in response to receiving the token and determining that the roll flag is not set.

* * * * *